(12) United States Patent
Terada

(10) Patent No.: US 12,078,222 B2
(45) Date of Patent: Sep. 3, 2024

(54) DISC SPRING, DISC SPRING DEVICE, AND METHOD FOR MANUFACTURING DISC SPRING

(71) Applicant: NHK SPRING CO., LTD., Yokohama (JP)

(72) Inventor: Yusuke Terada, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 256 days.

(21) Appl. No.: 17/281,331

(22) PCT Filed: Sep. 30, 2019

(86) PCT No.: PCT/JP2019/038479
§ 371 (c)(1),
(2) Date: Mar. 30, 2021

(87) PCT Pub. No.: WO2020/071303
PCT Pub. Date: Apr. 9, 2020

(65) Prior Publication Data
US 2021/0396292 A1    Dec. 23, 2021

(30) Foreign Application Priority Data
Oct. 2, 2018 (JP) .................. 2018-187308

(51) Int. Cl.
*F16F 3/02* (2006.01)
*B21D 35/00* (2006.01)
*F16F 1/32* (2006.01)

(52) U.S. Cl.
CPC .............. *F16F 3/02* (2013.01); *B21D 35/001* (2013.01); *F16F 1/32* (2013.01); *F16F 2226/04* (2013.01)

(58) Field of Classification Search
CPC . F16F 3/02; F16F 1/32; F16F 2226/04; B21D 35/001
See application file for complete search history.

(56) References Cited

U.S. PATENT DOCUMENTS 1,641,059 A    8/1927   Tausch
2,999,677 A *  9/1961   Schindler ................. F16F 3/02
                                                        267/206

(Continued)

FOREIGN PATENT DOCUMENTS

CN    101115935 A    1/2008
CN    101675264 A    3/2010

(Continued)

OTHER PUBLICATIONS

International Search Report for International Application No. PCT/JP2019/038479; Date of Mailing, Dec. 17, 2019.

(Continued)

Primary Examiner — Xuan Lan Nguyen
(74) Attorney, Agent, or Firm — CANTOR COLBURN LLP

(57) ABSTRACT

A disc spring which is used by arranging a plurality of the disk springs in an axial direction along a central axis includes an annular body plate portion that has an inner peripheral surface and an other peripheral surface which gradually extend toward one side in the axial direction from an outside toward an inside in a radial direction, and a stopper portion that protrudes from the body plate portion in a direction intersecting the inner peripheral surface and the outer peripheral surface of the body plate portion, in which in a case where an axial compression load is applied to a spring member in which a plurality of the disc springs are arranged in the axial direction, the stopper portion abuts another disk spring adjacent in the axial direction or a support member supporting an axial end portion of the (Continued)

spring member, the body plate portion and the stopper portion are integrally formed, and both axial end edges of the stopper portion are positioned inside both axial end edges of the body plate portion in the axial direction.

14 Claims, 6 Drawing Sheets

(56) References Cited

U.S. PATENT DOCUMENTS

| | | | |
|---|---|---|---|
| 3,758,095 A | 9/1973 | Mulhauser | |
| 7,134,648 B1 | 11/2006 | Rode | |
| 8,950,739 B2 * | 2/2015 | Tajima | F16F 1/32 267/136 |
| 9,976,617 B2 | 5/2018 | Campbell et al. | |
| 10,060,493 B2 * | 8/2018 | Terada | F16D 25/0638 |
| 2014/0017443 A1 * | 1/2014 | Matsuda | B21D 22/022 72/325 |
| 2016/0008864 A1 * | 1/2016 | Itaoka | B21D 22/21 72/343 |

FOREIGN PATENT DOCUMENTS

| | | |
|---|---|---|
| CN | 101929517 A | 12/2010 |
| CN | 107243543 A | 10/2017 |
| DE | 461150 C * | 6/1928 |
| DE | 1475254 A1 * | 12/1968 |
| DE | 19626754 | 1/1998 |
| DE | 202007017290 U1 | 12/2007 |
| JP | 46009607 Y | 4/1971 |
| JP | S52022648 A | 2/1977 |
| JP | S56049434 | 5/1981 |
| JP | S5913149 A | 1/1984 |
| JP | S62237129 A | 10/1987 |
| JP | H0446229 A | 2/1992 |
| JP | 2006105260 A | 4/2006 |
| JP | 2010203490 A | 9/2010 |
| JP | 2012163134 A | 8/2012 |
| RU | 2662113 C2 | 7/2018 |
| WO | 2017010284 A1 | 1/2017 |

OTHER PUBLICATIONS

CNIPA First Office Action for corresponding CN Application No. 201980064615.1; Issued on Apr. 29, 2022.

EPO Extended European Search Report for corresponding EP Application No. 19868562.0; Issued on May 31, 2022.

* cited by examiner

DISC SPRING, DISC SPRING DEVICE, AND METHOD FOR MANUFACTURING DISC SPRING

CROSS REFERENCE TO RELATED APPLICATIONS

This is the U.S. national stage of application No. PCT/JP2019/038479, filed on Sep. 30, 2019. Priority under 35 U.S.C. § 119(a) and 35 U.S.C. § 365(b) is claimed from Japanese Application No. 2018-187308, filed Oct. 2, 2018, the disclosure of which is also incorporated herein by reference.

TECHNICAL FIELD

The present invention relates to a disc spring, a disc spring device, and a method for manufacturing the disc spring. Priority is claimed on Japanese Patent Application No. 2018-187308, filed on Oct. 2, 2018, the content of which is incorporated herein by reference.

BACKGROUND ART

Conventionally, a disc spring device including a spring member in which a plurality of disc springs are arranged in an axial direction, and a pair of support members that support both end portions in the axial direction of the spring member has been known. As the disc spring device of this type, for example, as shown in Patent Document 1 below, a configuration in which a ring-shaped stopper is provided between disc springs adjacent to each other in the axial direction is known.

CITATION LIST

Patent Document
Patent Document 1
 Japanese Unexamined Patent Application, First Publication No. H4-46229

SUMMARY OF INVENTION

Technical Problem

However, in the conventional disc spring device, there is a problem that it takes time to dispose the stoppers between the disc springs at the time of assembly, relative positions of the disc spring and the stoppers are difficult to be stabilized, and it is difficult to accurately determine an amount of deformation in the axial direction of the disc spring, that is, a stroke, in a case where an axial compression load is applied to the spring member.

When the stroke of the disc spring is not determined, in a case where a disc spring having a lower axial spring constant than the others is included in a plurality of disc springs provided in the spring member, the disc spring may be deformed excessively in the axial direction and easily damaged.

The present invention has been made in consideration of such circumstances, and an object of the present invention is to provide a disc spring, and a disc spring device and a method for manufacturing the disc spring, which are capable of easily assembling a disc spring device and accurately determining a stroke of the disc spring.

Solution to Problem

A disc spring according to a first aspect of the present invention is a disc spring which is used by arranging a plurality of the disc springs in an axial direction along a central axis, the disc spring including an annular body plate portion that has an inner peripheral surface and an outer peripheral surface which gradually extend toward one side in the axial direction from an outside toward an inside in a radial direction, and a stopper portion that protrudes from the body plate portion in a direction intersecting the inner peripheral surface and the outer peripheral surface of the body plate portion, in which in a case where an axial compression load is applied to a spring member in which a plurality of the disc springs are arranged in the axial direction, the stopper portion abuts another disc spring adjacent in the axial direction or a support member supporting an axial end portion of the spring member, the body plate portion and the stopper portion are integrally formed, and both axial end edges of the stopper portion are positioned inside both axial end edges of the body plate portion in the axial direction.

According to the first aspect of the present invention, since the body plate portion and the stopper portion are integrally formed, the spring member in which a plurality of disc springs are arranged in the axial direction can be easily assembled, the stroke of the disc spring when the axial compression load is applied to the spring member can be accurately determined since the relative positions of the body plate portion and the stopper portion are fixed.

In addition, the disc spring is provided with the stopper portion and the axial compression load is applied to the spring member, such that when the disc spring is deformed in the axial direction, the stopper portion abuts other disc springs adjacent in the axial direction or a support member supporting the axial end portion of the spring member, thereby suppressing a deformation in the axial direction of the disc spring. Therefore, even in a case where a plurality of disc springs included in the spring member include a disc spring having a lower axial spring constant than the others, it is possible to regulate this disc spring from being excessively deformed in the axial direction.

Moreover, since the body plate portion and the stopper portion are integrally formed, a cross-sectional coefficient can be increased as compared with the body plate portion alone, and the spring constant and rigidity of the disc spring can be increased.

Here, the stopper portion may be disposed at a radial end portion of the body plate portion.

In this case, since the stopper portion is disposed at the radial end portion of the body plate portion with both axial end edges of the stopper portion positioned inside in the axial direction from both axial end edges of the body plate portion, the axial stroke of the disc spring can be easily secured for a long time.

In addition, since the stopper portion is disposed at the radial end portion of the body plate portion, when the axial compression load is applied to the spring member, the stopper portion can suppress the body plate portion from being further deformed after the stopper portion abuts other disc springs adjacent in the axial direction or the support member, compared to the configuration where the stopper portion is disposed in the radial intermediate portion of the body plate portion.

In addition, the stopper portion may be disposed at an inner peripheral edge or an outer peripheral edge of the body plate portion so as to be recessed with respect to any one of the outer peripheral surface and the inner peripheral surface of the body plate portion and to protrude with respect to the other.

In this case, since the stopper portion is disposed on the inner peripheral edge or the outer peripheral edge of the body plate portion so as to be recessed with respect to any one of the outer peripheral surface and the inner peripheral surface of the body plate portion and protrude with respect to the other, the stopper portion can be formed by stopping the step of punching the flat plate halfway before the through hole is formed, that is, by half punching. Therefore, the stopper portion can be formed by using a device having the same structure as a press machine for punching the flat plate, and the disc spring can be easily formed.

A disc spring device according to a second aspect of the present invention is a disc spring device including a spring member in which a plurality of disc springs are arranged in an axial direction, and a pair of support members that support both end portions in the axial direction of the spring member, in which the disc springs are the disc springs according to the present invention and are disposed in the axial direction side by side such that the disc springs adjacent to each other in the axial direction face opposite directions in the axial direction.

According to the second aspect of the present invention, since the disc spring is provided in which the body plate portion and the stopper portion are integrally formed, the disc spring device can be easily assembled, the stroke of the disc spring can be accurately determined, and the durability of the spring member can be reliably secured.

Here, the stopper portion may be disposed on an outer peripheral edge of the body plate portion so as to protrude with respect to the outer peripheral surface of the body plate portion and to be recessed with respect to the inner peripheral surface of the body plate portion, the support member may be axially opposed to the inner peripheral surface of the body plate portion of an end disc spring positioned on an outermost side in the axial direction among the plurality of disc springs and support the body plate portion of the end disc spring, and the stopper portion of the end disc spring may protrude inward in the axial direction and may be axially opposed to the stopper portion of another disc spring adjacent to the end disc spring in the axial direction.

In this case, since the support member supports not the stopper portion but the body plate portion positioned inside the stopper portion in the radial direction of the end disc spring, it is possible to increase the spring constant which appears when the axial compression load of the spring member is applied. Even in a case where the disc spring is made thin and the spring member is made light, the spring constant of the required size can be surely provided to the spring member.

In addition, since the support member is axially opposed to the inner peripheral surface of the body plate portion of the end disc spring and the stopper portion of the end disc spring protrudes inward in the axial direction, wear of the support member or the stopper portion due to contact of the stopper portion with the support member can be suppressed.

In addition, a method for manufacturing a disc spring according to a third aspect of the present invention forms the disc spring according to the present invention by subjecting a flat plate to punching and plastic working.

According to the third aspect of the present invention, since the disc spring is formed by punching and plastic working, it can be formed more efficiently than by cutting.

Here, the method for manufacturing the disc spring may include a first punching step of forming a first member that has an inner peripheral edge by punching the flat plate to form a through hole, a first plastic working step of forming a second member in which an inner peripheral portion and an outer peripheral portion having different axial positions are connected via a step portion by subjecting the first member to the plastic working, a second punching step of forming a third member in which the inner peripheral portion and the outer peripheral edge portion having different axial positions are connected via the step portion by subjecting the outer peripheral portion of the second member to the punching, and a second plastic working step of forming the disc spring by subjecting the third member to the plastic working, to form the inner peripheral portion of the third member on the body plate portion, and to form the outer peripheral edge portion of the third member on the stopper portion disposed so as to protrude with respect to an outer peripheral surface of the body plate portion and to be recessed with respect to an inner peripheral surface of the body plate portion.

According to the present invention, it is possible to form a disc spring in which the stopper portion is disposed on the outer peripheral edge of the body plate portion and both axial end edges of the stopper portion are positioned axially inside both axial end edges of the body plate portion.

Further, after the first plastic working step of forming the second member in which the inner peripheral portion and the outer peripheral edge portion having different axial positions are connected via the step portion by subjecting the first member to the plastic working, the second punching step of forming the third member by punching the outer peripheral portion of the second member is performed. Accordingly, the first plastic working step can be performed in a state where the length of the outer peripheral portion of the second member in the radial direction is secured to be long, and the step portion can be formed easily and accurately.

Advantageous Effects of Invention

According to the present invention, the disc spring device can be easily assembled and the stroke of the disc spring can be determined accurately.

DESCRIPTION OF EMBODIMENTS

Figure 1:
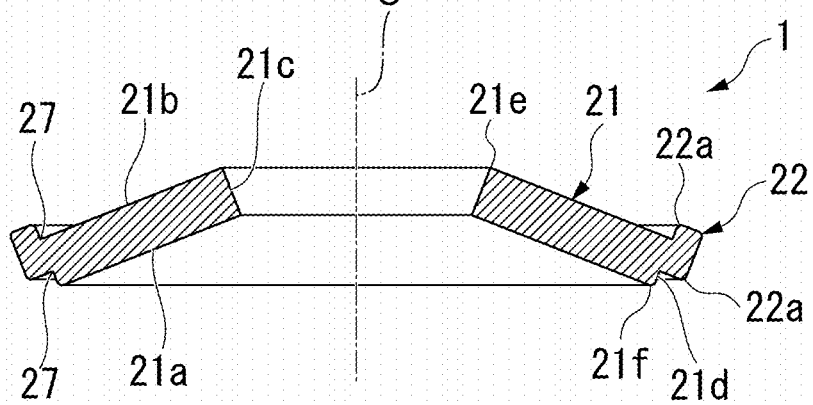
FIG. 1 is a vertical cross-sectional diagram of a disc spring shown as a first embodiment of the present invention.
Figure 2A:
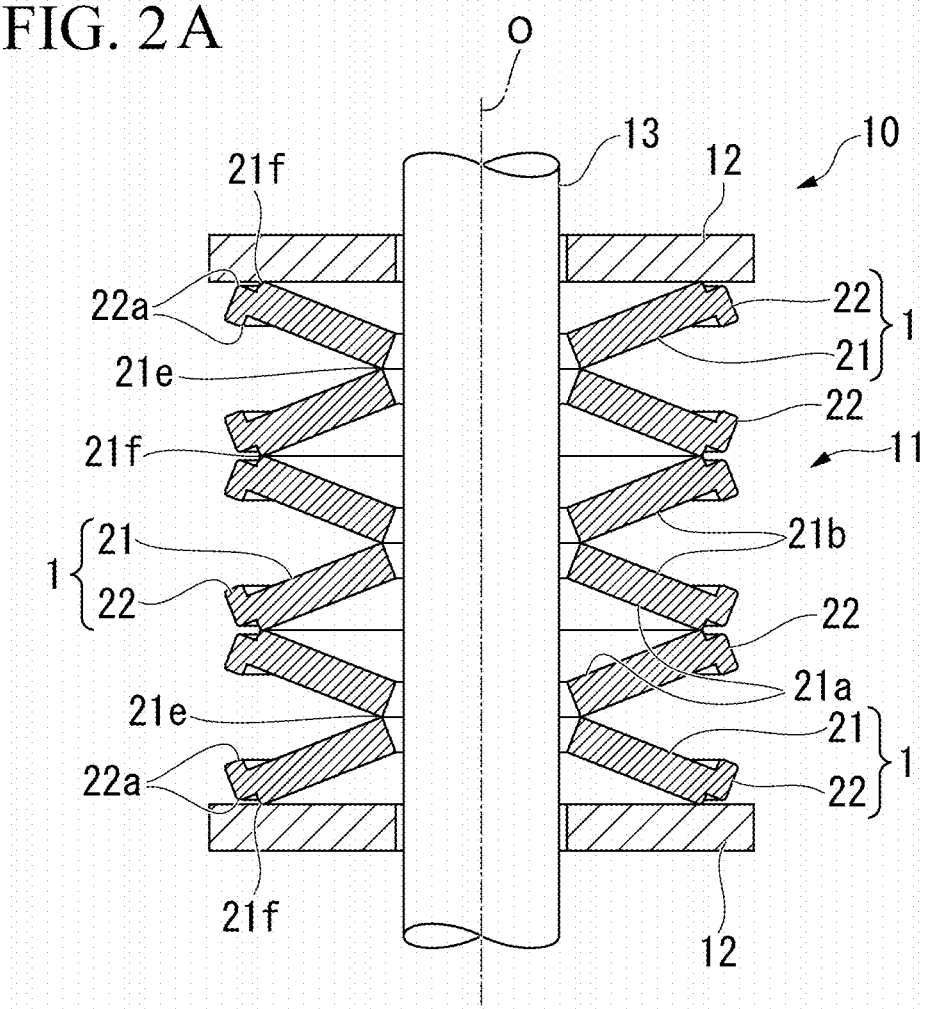
FIG. 2A is a vertical cross-sectional diagram of a disc spring device having the disc spring shown in FIG. 1.

Hereinafter, an embodiment of a disc spring device according to the present invention is described with reference to FIG. 1 and FIG. 2A.

A disc spring device 10 is applied to, for example, a main axis of a machining center, an ATC device of a machine tool, a precision indexing table for a machine tool, a small grinding spindle, and a high precision grinding spindle unit and the like. The disc spring device 10 includes a spring member 11, a support member 12, and an axis 13.

The spring member 11 is configured to dispose a plurality of disc springs 1 in an axial direction side by side along a central axis O thereof. The central axes O of a plurality of disc springs 1 coincide with each other. Two support members 12 are disposed at intervals in the axial direction to support both end portions of the spring member 11 in the axial direction. The support member 12 is formed in an annular shape. The axis 13 is integrally inserted inside each of the plurality of disc springs 1 and a pair of support members 12.

The pair of support members 12 and the axis 13 are disposed coaxially with the central axis O.

Hereinafter, a direction that intersects the central axis O when viewed from the axial direction is referred to as a radial direction.

The disc spring 1 includes a body plate portion 21 and a stopper portion 22. The body plate portion 21 and the stopper portion 22 are integrally formed.

The body plate portion 21 is formed in an annular shape having an inner peripheral edge 21c and an outer peripheral edge 21d. The body plate portion 21 has an inner peripheral surface 21a and an outer peripheral surface 21b that gradually extend toward one side in the axial direction from the outside toward the inside in the radial direction. The diameter of the inner peripheral edge 21c of the body plate portion 21 gradually increases from the other side in the axial direction toward one side. In the shown example, a radial width of the body plate portion 21 is larger than a thickness of the body plate portion 21. The diameter of the outer peripheral edge 21d of the body plate portion 21 is about twice the diameter of the inner peripheral edge 21c of the body plate portion 21.

The stopper portion 22 protrudes from the body plate portion 21 in a direction intersecting the inner peripheral surface 21a and the outer peripheral surface 21b. When an axial compression load is applied to the spring member 11, the stopper portion 22 abuts other disc springs 1 adjacent to each other in the axial direction. The stopper portion 22 is disposed at a radial end portion of the body plate portion 21. The stopper portion 22 extends continuously over the entire circumference.

In the shown example, the stopper portion 22 is disposed on the outer peripheral edge 21d of the body plate portion 21 so as to protrude with respect to the outer peripheral surface 21b of the body plate portion 21 and to be recessed with respect to the inner peripheral surface 21a of the body plate portion 21. That is, a step portion 27 is formed between the stopper portion 22 and the outer peripheral surface 21b of the body plate portion 21, and another step portion 27 is formed between the stopper portion 22 and the outer peripheral edge 21d of the body plate portion 21. The stopper portion 22 protrudes from the body plate portion 21 in a direction orthogonal to the inner peripheral surface 21a and the outer peripheral surface 21b.

The stopper portion 22 has a rectangular shape which is long in the direction orthogonal to the outer peripheral surface 21b and the inner peripheral surface 21a of the body plate portion 21 in a vertical cross-sectional view along the axial direction. In the vertical cross-sectional view, a length of the stopper portion 22 is equivalent to the thickness of the body plate portion 21. The volume of the stopper portion 22 is smaller than the volume of the body plate portion 21. Both axial end edges 22a of the stopper portion 22 are positioned inside both axial end edges 21e and 21f in the axial direction of the body plate portion 21. That is, in the disc spring 1, portions positioned on the outermost side in the axial direction are both axial end edges 21e and 21f in the axial direction of the body plate portion 21.

Here, both axial end edges 21e and 21f of the body plate portion 21 are separately positioned at a connecting portion between the outer peripheral surface 21b and the inner peripheral edge 21c, and at a connecting portion between the inner peripheral surface 21a and the outer peripheral edge 21d.

Hereinafter, out of both end edges 21e and 21f, the one positioned at the connecting portion between the outer peripheral surface 21b and the inner peripheral edge 21c is referred to as the first end edge 21e, and the one positioned at the connecting portion between the inner peripheral surface 21a and the outer peripheral edge 21d is referred to as the second end edge 21f.

The plurality of disc springs 1 included in the spring member 11 are disposed in the axial direction side by side such that the disc springs adjacent to each other in the axial direction face opposite directions in the axial direction. That is, the outer peripheral surfaces 21b of the body plate portion 21 of the disc springs 1 adjacent to each other in the axial direction are opposed to each other in the axial direction, and the inner peripheral surfaces 21a of the body plate portion 21 are opposed to each other in the axial direction.

Here, the support member 12 is axially opposed to the inner peripheral surface 21a of the body plate portion 21 of the end disc spring 1 positioned on an outermost side in the axial direction among the plurality of disc springs 1, and supports the body plate portion 21 of the end disc spring 1. The body plate portion 21 of the end disc spring 1 gradually extends toward the inside in the axial direction from the outside to the inside in the radial direction.

Among both end edges 21e and 21f of the body plate portion 21 of the end disc spring 1, the second end edge 21f abuts the support member 12, and the first end edge 21e abuts the first end edge 21e of the body plate portion 21 of other disc springs 1 adjacent to each other in the axial direction from the end disc spring 1. In the disc springs 1 adjacent to each other in the axial direction, the first end edges 21e of the body plate portion 21 abut each other, and the second end edges 21f of the body plate portion 21 abut each other.

The first end edge 21e and the second end edge 21f are each formed in an axially protruding curved surface shape.

Figure 2B:
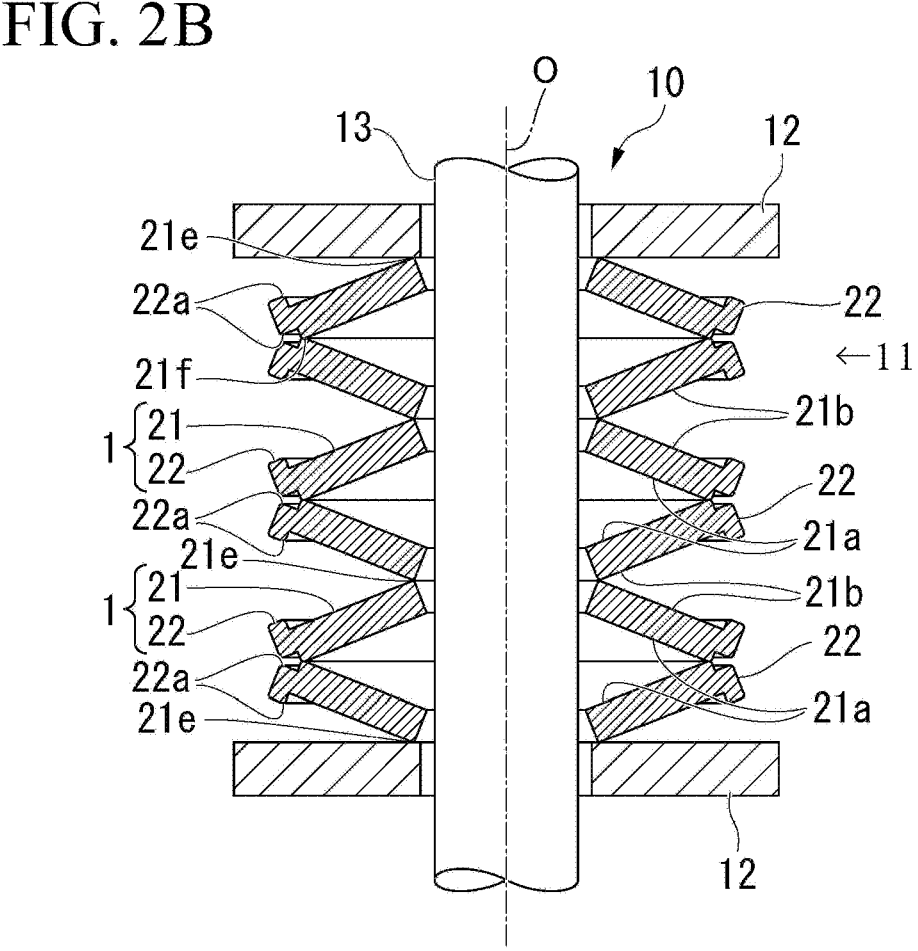
FIG. 2B is a vertical cross-sectional diagram of a disc spring device having the disc spring shown in FIG. 1.
Figure 3:
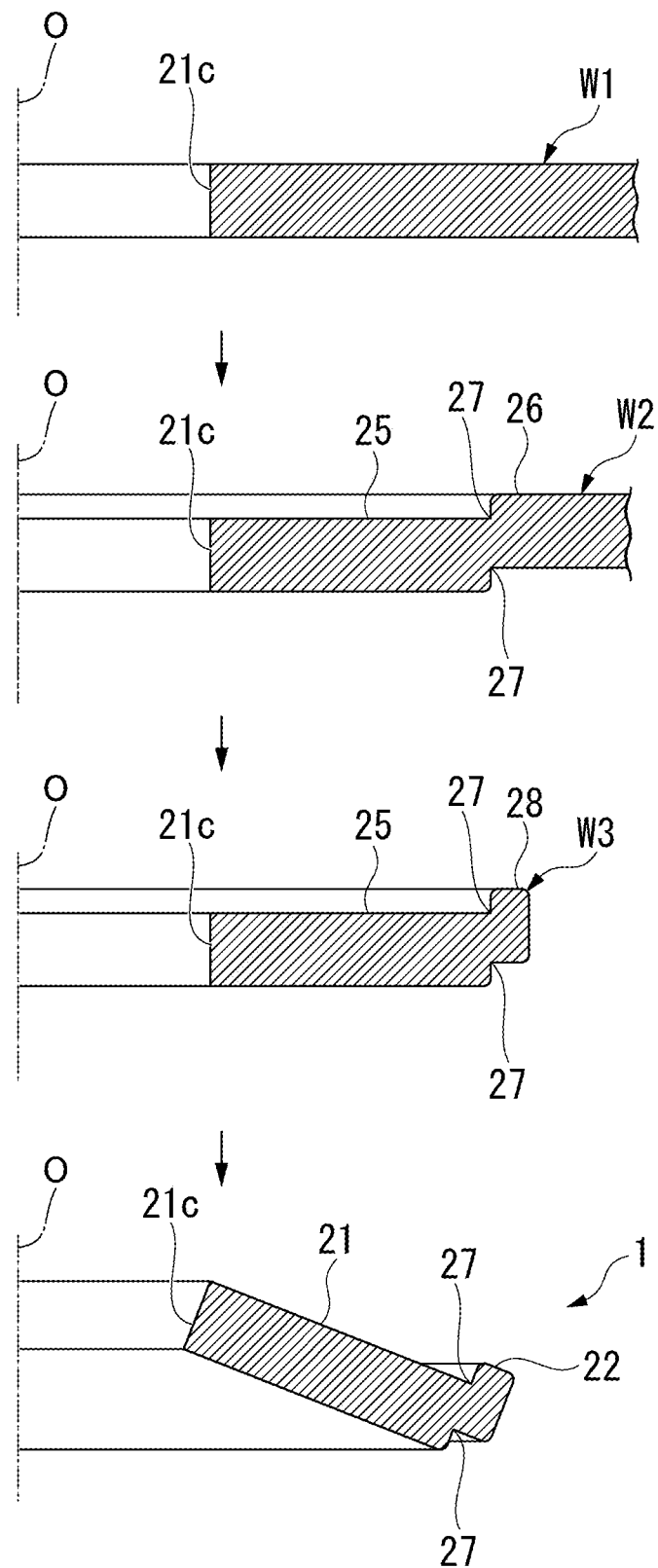
FIG. 3 is an explanatory diagram explaining a method of manufacturing the disc spring shown in FIG. 1 and FIG. 2A.

The stopper portion 22 of the end disc spring 1 protrudes toward the inside in the axial direction, and is opposed at intervals in the axial direction to the stopper portion 22 of other disc springs 1 adjacent to the end disc spring 1 in the axial direction. Then, in a case where the axial compression load is applied to the spring member 11, all the stopper portions 22 abut the stopper portion 22 of the other disc springs 1 adjacent in the axial direction. FIG. 2B is a drawing showing an example where the uppermost disc spring 1 shown in FIG. 2A is disposed in an orientation of the disc spring 1 disposed next to the uppermost disc spring 1 shown in FIG. 2A Next, a method of manufacturing the disc spring 1 configured as described above will be described with reference to FIG. 3.

First, a flat plate is punched to form a through hole, thereby forming a first member W1 having the inner peripheral edge 21c (a first punching step).

Next, the first member W1 is subjected to the plastic working, thereby forming a second member W2 in which the inner peripheral portion 25 and the outer peripheral portion 26 having different axial positions in the axial direction are connected via the step portion 27 (a first plastic working step). The second member W2 is formed by stopping the same punching as the first punching step on the first member W1 halfway before the through hole is formed. At this time, at least the inner peripheral portion 25 and the step portion 27 are positioned coaxially with the central axis O. The step portion 27 is formed on front and back surfaces of the second member W2.

Then, the outer peripheral portion 26 of the second member W2 is punched, and the inner peripheral portion 25 and the outer peripheral edge portion 28 having different axial positions in the axial direction are connected via the step portion 27 to form the third member W3 (a second punching step). At this time, the outer peripheral edge portion 28 is positioned coaxially with the central axis O.

Next, the plastic working is applied to the third member W3 such that the third member W3 gradually extends toward one side in the axial direction from the outside toward the inside in the radial direction, and the inner peripheral portion 25 of the third member W3 is formed on the body plate portion 21 and the outer peripheral edge portion 28 is formed on the stopper portion 22, thereby forming the disc spring 1 (a second plastic working step).

Then, the disc spring 1 is quenched and tempered.

As described above, depending on the disc spring 1 and the disc spring device 10 according to the present embodiment, since the body plate portion 21 and the stopper portion 22 are integrally formed, the spring member 11 in which the plurality of disc springs 1 are arranged in the axial direction can be easily assembled, the stroke of the disc spring 1 when the axial compression load is applied to the spring member 11 can be accurately determined since the relative positions of the body plate portion 21 and the stopper portion 22 are fixed.

In addition, the disc spring 1 is provided with the stopper portion 22 and the axial compression load is applied to the spring member 11, such that when the disc spring 1 is deformed in the axial direction, the stopper portion 22 abuts other disc springs 1 adjacent in the axial direction, thereby suppressing a deformation in the axial direction of the disc spring 1. Therefore, even in a case where a plurality of disc springs 1 included in the spring member 11 include the disc spring 1 having a lower axial spring constant than the others, it is possible to regulate this disc spring 1 from being excessively deformed in the axial direction.

Moreover, since the body plate portion 21 and the stopper portion 22 are integrally formed, a cross-sectional coefficient can be increased as compared with the body plate portion 21 alone, and the spring constant and rigidity of the disc spring 1 can be increased.

Figure 4:
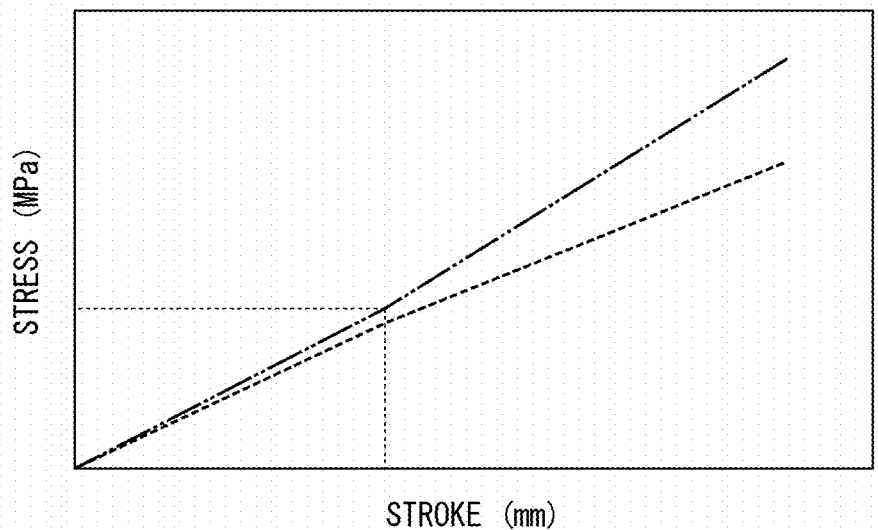
FIG. 4 is an explanatory diagram showing one of working effect of the disc spring shown in FIG. 1 and FIG. 2A.

Here, FIG. 4 shows a stress and stroke diagram obtained when the axial compression load is applied to the disc spring 1. In FIG. 4, the broken line represents the stress and stroke diagram at a radial inner end edge of the inner peripheral surface 21a of the body plate portion 21, and a 2-dot chain line represents the stress and stroke diagram at the second end edge 21f of the body plate portion 21.

Then, as shown in FIG. 4, in a process in which the axial compression load is applied to the spring member 11 and when the disc spring 1 is deformed in the axial direction, in a case where the deformation of the disc spring 1 is regulated by the stopper portion 22 to the state indicated by the dotted line, further stress is not generated in the disc spring 1, such that the disc spring 1 can be prevented from being damaged.

In addition, since the stopper portion 22 is disposed at the radial end portion of the body plate portion 21 with both axial end edges 22a of the stopper portion 22 positioned inside in the axial direction from both axial end edges 21e and 21f of the body plate portion 21, the axial stroke of the disc spring 1 can be easily secured for a long time.

Further, since the stopper portion 22 is disposed at the radial end portion of the body plate portion 21, when the axial compression load is applied to the spring member 11, the stopper portion 22 can suppress the body plate portion 21 from being further deformed after the stopper portion 22 abuts other disc springs 1 adjacent in the axial direction, compared to a configuration where the stopper portion 22 is disposed in a radial intermediate portion of the body plate portion 21.

Since the stopper portion 22 is disposed on the outer peripheral edge 21d of the body plate portion 21 so as to protrude with respect to the outer peripheral surface 21b of the body plate portion 21 and to be recessed with respect to the inner peripheral surface 21a of the body plate portion 21, the stopper portion 22 can be formed by stopping the step of punching the flat plate halfway before the through hole is formed, that is, by half punching. Therefore, the stopper portion 22 can be formed by using a device having the same structure as a press machine for punching the flat plate, and the disc spring 1 can be easily formed.

In addition, since the support member 12 supports not the stopper portion 22 but the body plate portion 21 positioned inside the stopper portion 22 in the radial direction of the end disc spring 1, it is possible to increase the spring constant which appears when the axial compression load of the spring member 11 is applied. Even in a case where the disc spring 1 is made thin and the spring member 11 is made light, the spring constant of the required size can be surely provided to the spring member 11.

In addition, since the support member 12 is axially opposed to the inner peripheral surface 21a of the body plate portion 21 of the end disc spring 1 and the stopper portion 22 of the end disc spring 1 protrudes inward in the axial direction, wear of the support member 12 or the stopper portion 22 due to contact of the stopper portion 22 with the support member 12 can be suppressed.

According to the method of manufacturing the disc spring according to the present embodiment, since the disc spring 1 is formed by punching and plastic working, it is possible to form the disc spring 1 more efficiently than by cutting.

Further, in the present embodiment, after the first plastic working step of forming the second member W2 in which the inner peripheral portion 25 and the outer peripheral portion 26 having different axial positions are connected via the step portion 27 by subjecting the first member W1 to the plastic working, the second punching step of forming the third member W3 by punching the outer peripheral portion 26 of the second member W2 is performed. Accordingly, the first plastic working step can be performed in a state where the length of the outer peripheral portion 26 of the second member W2 in the radial direction is secured to be long, and the step portion 27 can be formed easily and accurately.

Figure 5:
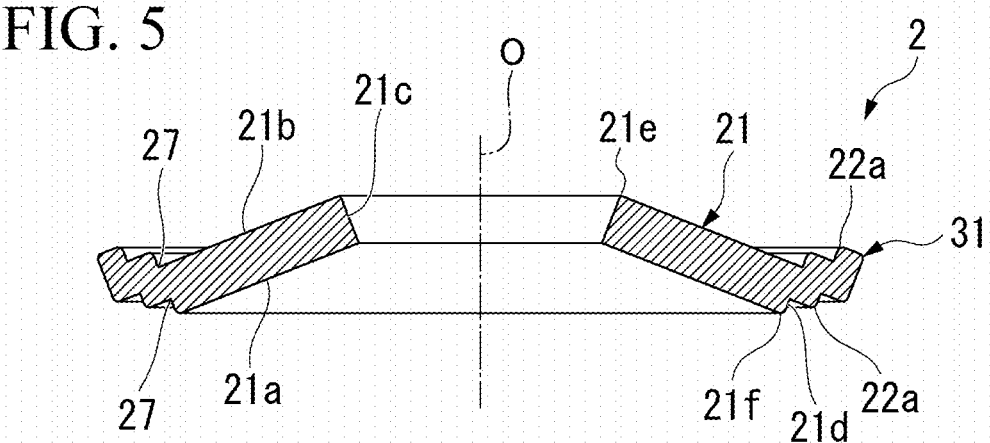
FIG. 5 is a vertical cross-sectional diagram of a disc spring shown as a second embodiment of the present invention.

Next, the disc spring 2 according to a second embodiment of the present invention will be described with reference to FIG. 5.

In the second embodiment, the same portion as the components in the first embodiment are designated by the same reference numerals, the description thereof will be omitted, and only the differences will be described.

In the disc spring 2 of the present embodiment, a stopper portion 31 is formed in a multi-stage shape such that the portion positioned on the outer side in the radial direction is positioned on one side in the axial direction. The disc spring 2 can be formed by performing the first plastic working step a plurality of times and performing the same steps as in the former embodiment.

Also in the disc spring 2 of the present embodiment, at least the disc spring device can be easily assembled, and the stroke of the disc spring 2 can be accurately determined. In addition, since the stopper portion 31 is formed in the multi-stage shape, an amount of protrusion of the stopper portion 31 from the outer peripheral surface 21b of the body plate portion 21 can be increased while securing the strength of the disc spring 2.

Figure 6:
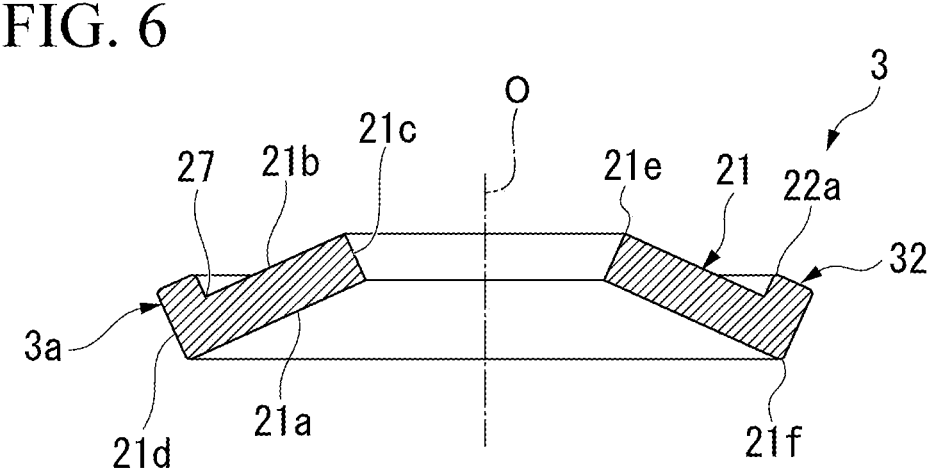
FIG. 6 is a vertical cross-sectional diagram of a disc spring shown as a third embodiment of the present invention.

Next, a disc spring 3 according to a third embodiment of the present invention will be described with reference to FIG. 6.

In the third embodiment, the same portion as the components in the first embodiment are designated by the same reference numerals, the description thereof will be omitted, and only the differences will be described.

In the disc spring 3 of the present embodiment, the stopper portion 32 is disposed on the outer peripheral edge portion of the outer peripheral surface 21b of the body plate portion 21. The stopper portion 32 has a rectangular shape which is elongated in the direction along the outer peripheral surface 21b and the inner peripheral surface 21a of the body plate portion 21 in a vertical cross-sectional view along the axial direction. The stopper portion 32 is flush with the outer peripheral edge 21d of the body plate portion 21.

The disc spring 3 is formed, for example, as follows.

First, the flat plate is punched to form an annular first member having an inner peripheral edge 21c and an outer peripheral edge 3a. Next, the first member is subjected to press processing or forging processing, and an entire area except the outer peripheral edge portion is compressed and deformed in a thickness direction to form the second member. Then, the second member is subjected to the same process as in the second plastic working step, whereby a portion of the second member positioned inside from the outer peripheral edge portion in the radial direction is formed on the body plate portion 21, and the outer peripheral edge portion is formed on the stopper portion 32 to form the disc spring 3. At this time, out of the outer peripheral edge 3a of the first member, a lower portion is the outer peripheral edge 21d of the body plate portion 21, and the upper portion is the outer peripheral edge of the stopper portion 32.

Also in the disc spring 3 of the present embodiment, at least the disc spring device can be easily assembled, and the stroke of the disc spring 3 can be accurately determined.

Figure 7:
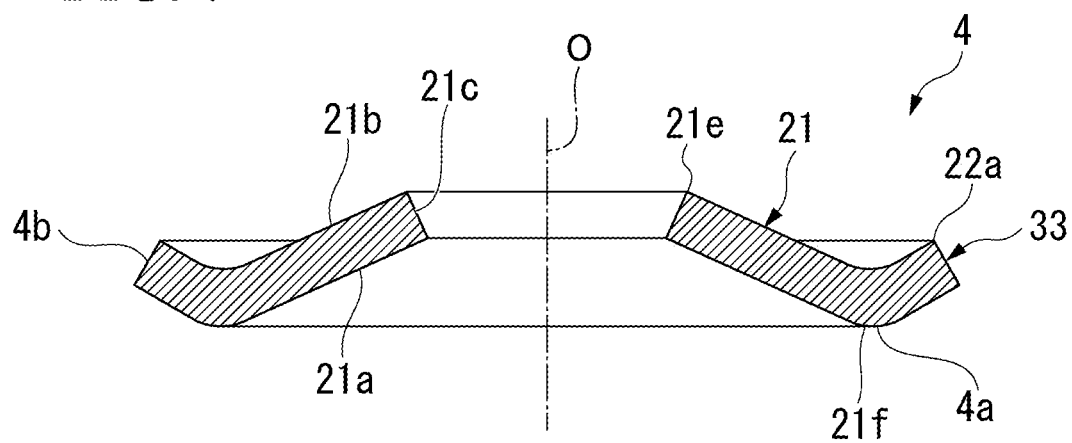
FIG. 7 is a vertical cross-sectional diagram of a disc spring shown as a fourth embodiment of the present invention.

Next, a disc spring 4 according to a fourth embodiment of the present invention will be described with reference to FIG. 7.

In the fourth embodiment, the same portion as the components in the first embodiment are designated by the same reference numerals, the description thereof will be omitted, and only the differences will be described.

In the disc spring 4 of the present embodiment, the stopper portion 33 gradually extends from the outer peripheral edge of the body plate portion 21 toward one side in the axial direction toward the outside in the radial direction. The stopper portion 33 is smoothly connected to the outer peripheral surface 21b and the inner peripheral surface 21a of the body plate portion 21 via a curved surface portion 4a without any step.

The disc spring 4 is formed, for example, as follows.

First, the flat plate is punched to form an annular first member having the inner peripheral edge 21c and an outer peripheral edge 4b. Next, out of the first member, the outer peripheral edge portion is plastically deformed so as to gradually extend toward one side in the axial direction from the inside toward the outside in the radial direction to form the stopper portion 33, and a portion positioned inside in the radial direction from the outer peripheral edge portion is plastically deformed so as to gradually extend toward one side in the axial direction from the outside toward the inside in the radial direction to form the body plate portion 21, thereby forming the disc spring 4.

Also in the disc spring 4 of the present embodiment, at least the disc spring device can be easily assembled, and the stroke of the disc spring 4 can be accurately determined.

Figure 8:
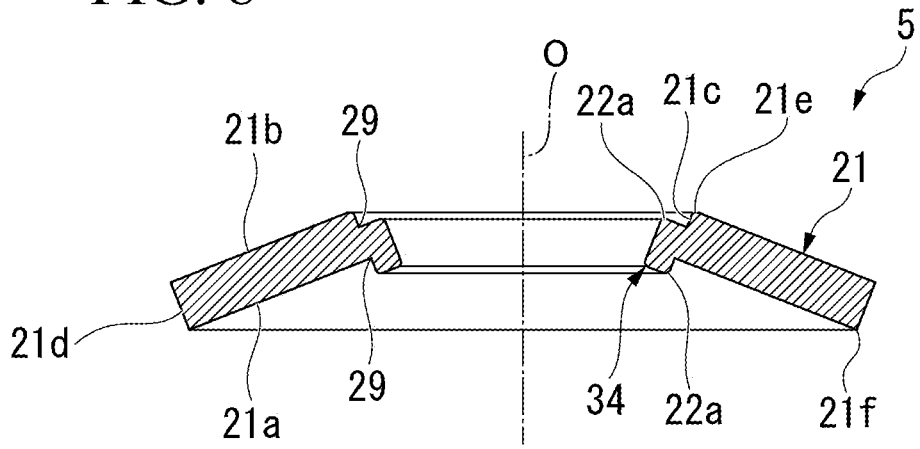
FIG. 8 is a vertical cross-sectional diagram of a disc spring shown as a fifth embodiment of the present invention.
Figure 9:
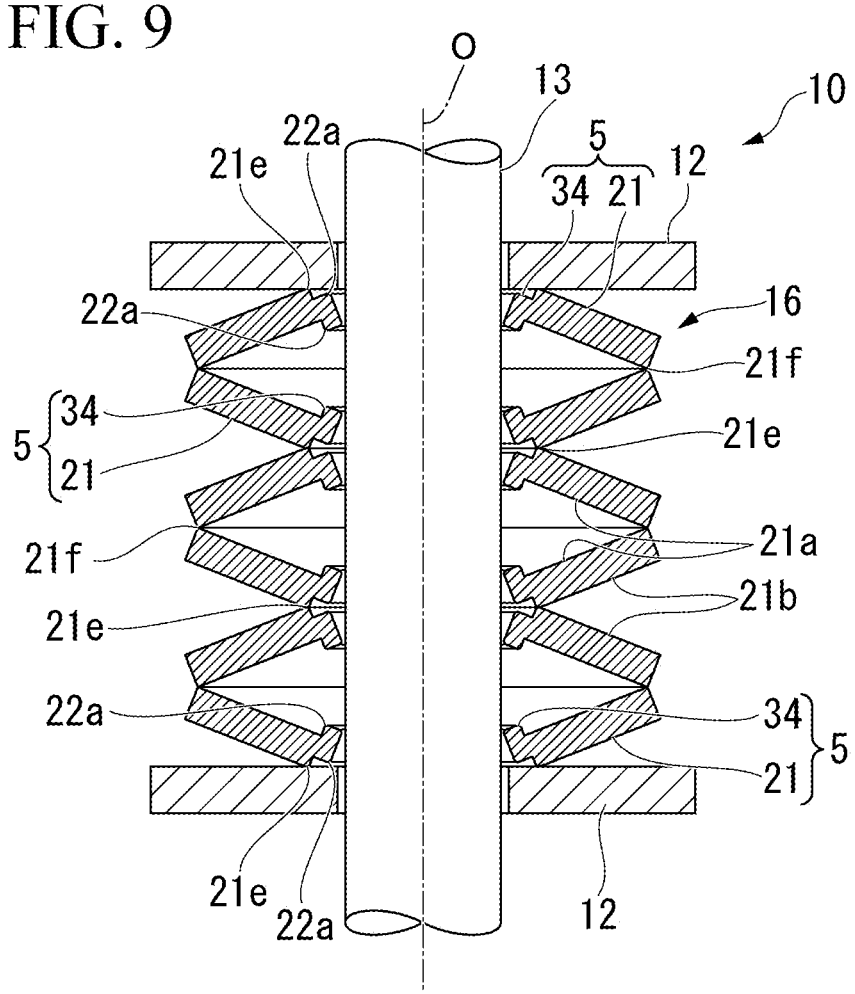
FIG. 9 is a vertical cross-sectional diagram of a disc spring device having the disc spring shown in FIG. 8.

Next, a disc spring 5 according to a fifth embodiment of the present invention will be described with reference to FIG. 8 and FIG. 9.

In the fifth embodiment, the same portion as the components in the first embodiment are designated by the same reference numerals, the description thereof will be omitted, and only the differences will be described.

In the disc spring 5 of the present embodiment, a stopper portion 34 is disposed on the inner peripheral edge 21c of the body plate portion 21 so as to protrude with respect to the inner peripheral surface 21a of the body plate portion 21 and to be recessed with respect to the outer peripheral surface 21b of the body plate portion 21. That is, a step portion 29 is formed between the stopper portion 34 and the inner peripheral surface 21a of the body plate portion 21, and another step portion 29 is formed between the stopper portion 34 and the inner peripheral edge 21c of the body plate portion 21.

The support member 12 is axially opposed to the outer peripheral surface 21b of the body plate portion 21 of the end disc spring 5 positioned on an outermost side in the axial direction among a plurality of disc springs 5 of the spring member 16 and supports the body plate portion 21 of the end disc spring 5. The body plate portion 21 of the end disc spring 5 gradually extends toward the outside in the axial direction from the outside toward the inside in the radial direction.

Among both end edges 21e and 21f of the body plate portion 21 of the end disc spring 5, the first end edge 21e abuts the support member 12, and the second end edge 21f abuts the second end edge 21f of the body plate portion 21 of other disc springs 5 adjacent to each other in the axial direction from the end disc spring 5. In the disc springs 5 adjacent to each other in the axial direction, the first end edges 21e of the body plate portion 21 abut each other, and the second end edges 21f of the body plate portion 21 abut each other.

Also in the disc spring 5 of the present embodiment, at least the disc spring device can be easily assembled, and the stroke of the disc spring 5 can be accurately determined.

The technical scope of the present invention is not limited to the above-described embodiment, and various modifications can be made without departing from the scope of the present invention.

For example, in the above-described embodiment, the stopper portions 22, 31, 32, 33, and 34 are disposed at the radial end portion of the body plate portion 21, but may be disposed at the radial intermediate portion of the body plate portion 21.

In addition, in the above-described embodiment, the solid stopper portions 22, 31, 32, 33, and 34 are shown, but they may be formed hollow.

Additionally, in the above-described embodiment, the disc springs 1 to 5 has a configuration in which the first end edge 21e and the second end edge 21f abutting the other disc springs 1 to 5 or the support member 12 are formed in a curved surface shape protruding in the axial direction, but the disc springs 1 to 5 may be formed in a flat surface extending in the radial direction such that they are in surface contact with each other.

Further, in the above-described embodiment, as the spring members 11 and 16, a configuration in which the body plate portion 21 abuts the support member 12 is shown, but may adopt a configuration in which the stopper portions 22 and 34 abuts the support member 12. In this configuration, when the axial compression load is applied to the spring member, the body plate portion 21 may abut the support member 12 instead of the stopper portions 22 and 34.

Furthermore, in the above-described embodiment, when the axial compression load is applied to the spring member, a configuration in which the stopper portion of the end disc spring abuts other disc springs adjacent in the axial direction is shown, but a configuration in which the stopper portion abuts the support member 12 may be adopted.

In addition, it is possible to replace the components in the above-described embodiment with well-known components as appropriate without departing from the scope of the present invention, and the above-described modified examples may be appropriately combined.

INDUSTRIAL APPLICABILITY

By applying the disc spring, the disc spring device, and the method for manufacturing the disc spring of the present application to the art, the disc spring device can be easily assembled and the stroke of the disc spring can be determined accurately.

REFERENCE SIGNS LIST

1, 2, 3, 4, 5: Disc spring, end disc spring
10: Disc spring device
11, 16: Spring member
12: Support member
21: Body plate portion
21a: Inner peripheral surface of body plate portion
21b: Outer peripheral surface of body plate portion
21c: Inner peripheral edge of body plate portion
21d: Outer peripheral edge of body plate portion
21e, 21f: Axial end edge of body plate portion
22, 31, 32, 33, 34: Stopper portion
22a: Axial end edge of stopper portion
25: Inner peripheral portion
26: Outer peripheral portion
27: Step portion
28: Outer peripheral edge portion
O: Central axis
W1: First member
W2: Second member
W3: Third member

What is claimed is:

1. A disc spring device comprising:
a spring member in which a plurality of disc springs are arranged in an axial direction along a central axis of the plurality of disc springs; and
a pair of support members that support both end portions in the axial direction of the spring member, wherein the disc spring comprises:
an annular body plate portion that has an inner peripheral surface and an outer peripheral surface which gradually extend toward one side in the axial direction from an outside toward an inside in a radial direction; and
a stopper portion that protrudes from the body plate portion in a direction orthogonal to the inner peripheral surface and the outer peripheral surface of the body plate portion, the stopper portion having a protrusion part protruding with respect to the inner peripheral surface or the outer peripheral surface,
the plurality of disc springs includes a first disc spring positioned on an outermost side in the axial direction, a second disc spring adjacent to the first disc spring in the axial direction, and a third disc spring adjacent to the second disc spring in the axial direction, a first support member of the pair of support members being axially opposed to the first disc spring and being configured to support the first disc spring,
in a case where no axial compression load is applied to the spring member, the protrusion part of the stopper portion of the first disc spring is configured to be opposed at a first interval in the axial direction to the protrusion part of the stopper portion of the second disc spring or the first support member, and the protrusion part of the stopper portion of the second disc spring is configured to be opposed at a second interval in the axial direction to the protrusion part of the stopper portion of the first disc spring or the protrusion part of the stopper portion of the third disc spring,
in a case where an axial compression load is applied to the spring member, the protrusion part of the stopper portion of the first disc spring is configured to abut the protrusion part of the stopper portion of the second disc spring or the first
support member, and the protrusion part of the stopper portion of the second disc spring is configured to abut the protrusion part of the stopper portion of the first disc spring or the protrusion part of the stopper portion of the third disc spring,
the body plate portion and the stopper portion are integrally formed, and
both axial end edges of the stopper portion are positioned inside both axial end edges of the body plate portion in the axial direction.

2. The disc spring device according to claim 1, wherein the stopper portion is disposed at a radial end portion of the body plate portion.

3. The disc spring device according to claim 1, wherein the stopper portion is disposed at an inner peripheral edge or an outer peripheral edge of the body plate portion so as to be recessed with respect to any one of the outer peripheral surface and the inner peripheral surface of the body plate portion and to protrude with respect to the other.

4. The disc spring device according to claim 1, wherein the disc springs are disposed in the axial direction side by side such that the disc springs adjacent to each other in the axial direction face opposite directions in the axial direction.

5. The disc spring device according to claim 4, wherein the stopper portion is disposed on an outer peripheral edge of the body plate portion so as to protrude with respect to the outer peripheral surface of the body plate portion and to be recessed with respect to the inner peripheral surface of the body plate portion, the first support member is axially opposed to the inner peripheral surface of the body plate portion of the first disc spring, and supports the body plate portion of the first disc spring, and the stopper portion of the first disc spring protrudes inward in the axial direction, and is axially opposed to the stopper portion of the second disc spring.

6. A method for manufacturing a disc spring, the disc spring manufactured by the method for manufacturing the disc spring being used by arranging a plurality of the disc springs in an axial direction along a central axis, wherein the disc spring includes:

an annular body plate portion that has an inner peripheral surface and an outer peripheral surface which gradually extend toward one side in the axial direction from an outside toward an inside in a radial direction; and a stopper portion that protrudes from the body plate portion in a direction intersecting the inner peripheral surface and the outer peripheral surface of the body plate portion, the stopper portion having a protrusion part protruding with respect to the inner peripheral surface or the outer peripheral surface, the plurality of the disc springs includes a first disc spring positioned on an outermost side in the axial direction, a second disc spring adjacent to the first disc spring in the axial direction, and a third disc spring adjacent to the second disc spring in the axial direction, in a case where an axial compression load is applied to a spring member in which the plurality of the disc springs are arranged in the axial direction, the protrusion part of the stopper portion of the first disc spring is configured to abut the protrusion part of the stopper portion of the second disc spring or a support member supporting an axial end portion of the spring member, and the protrusion part of the stopper portion of the second disc spring is configured to abut the protrusion part of the stopper portion of the first disc spring or the protrusion part of the stopper portion of the third disc spring, the body plate portion and the stopper portion are integrally formed, and both axial end edges of the stopper portion are positioned inside both axial end edges of the body plate portion in the axial direction, the method for manufacturing a disc spring comprises:

a first punching step of forming a first member from a flat plate that has an inner peripheral edge by punching the flat plate to form a through hole;

a first plastic working step of forming a second member from the first member in which an inner peripheral portion and an outer peripheral portion having different axial positions are connected via a step portion by subjecting the first member to the plastic working;

a second punching step of forming a third member from the second member in which the inner peripheral portion and the outer peripheral edge portion having different axial positions are connected via the step portion by subjecting the outer peripheral portion of the second member to the punching; and a second plastic working step of forming the disc spring from the third member by subjecting the third member to the plastic working, to form the inner peripheral portion of the third member on the body plate portion, and to form the outer peripheral edge portion of the third member on the stopper portion disposed so as to protrude with respect to an outer peripheral surface of the body plate portion and to be recessed with respect to an inner peripheral surface of the body plate portion.

7. The disc spring device according to claim 2, wherein the stopper portion is disposed at an inner peripheral edge or an outer peripheral edge of the body plate portion so as to be recessed with respect to any one of the outer peripheral surface and the inner peripheral surface of the body plate portion and to protrude with respect to the other.

8. The disc spring device according to claim 2, wherein the disc springs are disposed in the axial direction side by side such that the disc springs adjacent to each other in the axial direction face opposite directions in the axial direction.

9. The disc spring device according to claim 3, wherein the disc springs are disposed in the axial direction side by side such that the disc springs adjacent to each other in the axial direction face opposite directions in the axial direction.

10. The disc spring device according to claim 7, wherein the disc springs are disposed in the axial direction side by side such that the disc springs adjacent to each other in the axial direction face opposite directions in the axial direction.

11. The disc spring device according to claim 8, wherein the stopper portion is disposed on an outer peripheral edge of the body plate portion so as to protrude with respect to the outer peripheral surface of the body plate portion and to be recessed with respect to the inner peripheral surface of the body plate portion, the first support member is axially opposed to the inner peripheral surface of the body plate portion of the first disc spring, and supports the body plate portion of the first disc spring, and the stopper portion of the first disc spring protrudes inward in the axial direction, and is axially opposed to the stopper portion of the second disc spring.

12. The disc spring device according to claim 9, wherein the stopper portion is disposed on an outer peripheral edge of the body plate portion so as to protrude with respect to the outer peripheral surface of the body plate portion and to be recessed with respect to the inner peripheral surface of the body plate portion, the first support member is axially opposed to the inner peripheral surface of the body plate portion of the first disc spring, and supports the body plate portion of the first disc spring, and the stopper portion of the first disc spring protrudes inward in the axial direction, and is axially opposed to the stopper portion of the second disc spring.

13. The disc spring device according to claim 10, wherein the stopper portion is disposed on an outer peripheral edge of the body plate portion so as to protrude with respect to the outer peripheral surface of the body plate portion and to be recessed with respect to the inner peripheral surface of the body plate portion, the first support member is axially opposed to the inner peripheral surface of the body plate portion of the first disc spring, and supports the body plate portion of the first disc spring, and the stopper portion of the first disc spring protrudes inward in the axial direction, and is axially opposed to the stopper portion of the second disc spring.

14. A method for manufacturing a disc spring, the disc spring manufactured by the method for manufacturing the disc spring being used by arranging a plurality of the disc springs in an axial direction along a central axis, wherein the disc spring includes:

an annular body plate portion that has an inner peripheral surface and an outer peripheral surface which gradually extend toward one side in the axial direction from an outside toward an inside in a radial direction; and a stopper portion that protrudes from the body plate portion in a direction intersecting the inner peripheral surface and the outer peripheral surface of the body plate portion, the stopper portion having a protrusion part protruding with respect to the inner peripheral surface or the outer peripheral surface, the plurality of the disc springs includes a first disc spring positioned on an outermost side in the axial direction, a second disc spring adjacent to the first disc spring in the axial direction, and a third disc spring adjacent to the second disc spring in the axial direction, in a case where an axial compression load is applied to a spring member in which the a plurality of the disc springs are arranged in the axial direction, the protrusion part of the stopper portion of the first disc spring is configured to abut the protrusion part of the stopper portion of the second disc spring or a support member supporting an axial end portion of the spring member, and the protrusion part of the stopper portion of the second disc spring is configured to abut the protrusion part of the stopper portion of the first disc spring or the protrusion part of the stopper portion of the third disc spring, the body plate portion and the stopper portion are integrally formed, both axial end edges of the stopper portion are positioned inside both axial end edges of the body plate portion in the axial direction, the stopper portion is disposed at a radial end portion of the body plate portion, the method for manufacturing a disc spring comprises:

a first punching step of forming a first member from a flat plate that has an inner peripheral edge by punching the flat plate to form a through hole;

a first plastic working step of forming a second member from the first member in which an inner peripheral portion and an outer peripheral portion having different axial positions are connected via a step portion by subjecting the first member to the plastic working;

a second punching step of forming a third member from the second member in which the inner peripheral portion and the outer peripheral edge portion having different axial positions are connected via the step portion by subjecting the outer peripheral portion of the second member to the punching; and a second plastic working step of forming the disc spring from the third member by subjecting the third member to the plastic working, to form the inner peripheral portion of the third member on the body plate portion, and to form the outer peripheral edge portion of the third member on the stopper portion disposed so as to protrude with respect to an outer peripheral surface of the body plate portion and to be recessed with respect to an inner peripheral surface of the body plate portion.

* * * * *